(12) United States Patent
Shirokawa et al.

(10) Patent No.: US 11,668,607 B2
(45) Date of Patent: Jun. 6, 2023

(54) THERMISTOR ELEMENT AND ELECTROMAGNETIC WAVE SENSOR

(71) Applicant: TDK CORPORATION, Tokyo (JP)

(72) Inventors: Maiko Shirokawa, Tokyo (JP); Shinji Hara, Tokyo (JP); Naoki Ohta, Tokyo (JP); Susumu Aoki, Tokyo (JP); Eiji Komura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/540,004

(22) Filed: Dec. 1, 2021

(65) Prior Publication Data
US 2022/0178759 A1 Jun. 9, 2022

(30) Foreign Application Priority Data
Dec. 4, 2020 (JP) .............................. JP2020-201818

(51) Int. Cl.
*G01J 5/22* (2006.01)
*G01J 5/0831* (2022.01)
*G01J 5/20* (2006.01)

(52) U.S. Cl.
CPC ............... *G01J 5/22* (2013.01); *G01J 5/0831* (2013.01); *G01J 2005/202* (2013.01)

(58) Field of Classification Search
CPC ............................ G01J 1/44; G01J 2001/4473
USPC ....................................................... 250/338.4
See application file for complete search history.

(56) References Cited

U.S. PATENT DOCUMENTS

| 6,475,604 | B1 | 11/2002 | Fujii et al. |
| 2020/0408604 | A1 | 12/2020 | Ohta et al. |

FOREIGN PATENT DOCUMENTS

| JP | H06-231905 A | 8/1994 | |
| JP | 2000-348903 A | 12/2000 | |
| JP | 2020087949 A * | 6/2020 | ............... H01C 7/02 |
| WO | 2019/171488 A1 | 9/2019 | |

* cited by examiner

*Primary Examiner* — David P Porta
*Assistant Examiner* — Gisselle M Gutierrez
(74) *Attorney, Agent, or Firm* — Oliff PLC

(57) ABSTRACT

A thermistor element includes a thermistor film, a first electrode provided in contact with one surface of the thermistor film, and a pair of second electrodes provided in contact with the other surface of the thermistor film, wherein the thermistor film includes an oxide having a spinel crystal structure and having a [111] preferred orientation in a film thickness direction.

3 Claims, 8 Drawing Sheets

US 11,668,607 B2

THERMISTOR ELEMENT AND ELECTROMAGNETIC WAVE SENSOR

BACKGROUND

The present disclosure relates to a thermistor element and an electromagnetic wave sensor.

Priority is claimed on Japanese Patent Application No. 2020-201818, filed on Dec. 4, 2020 the content of which are incorporated herein by reference.

For example, there is a temperature sensor using a thermistor element (see, for example, Patent Document 1 below). Also, there is an electromagnetic wave sensor using a thermistor element (see, for example, Patent Document 2 below).

The electrical resistance of a thermistor film included in a thermistor element changes according to change in temperature of the thermistor film. In an electromagnetic wave sensor, infrared rays (electromagnetic waves) incident on a thermistor film are absorbed by the thermistor film or materials around the thermistor film, and thereby a temperature of the thermistor film changes. Thereby, the thermistor element detects the infrared rays (electromagnetic waves).

Here, according to the Stefan-Boltzmann law, there is a correlation between a temperature of a measurement target and infrared rays (radiant heat) emitted from the measurement target by thermal radiation. Therefore, when infrared rays emitted from a measurement target are detected using a thermistor element, a temperature of the measurement target can be measured in a non-contact manner.

Also, such a thermistor element is applied to an electromagnetic wave sensor such as an infrared imaging element (infrared image sensor) that detects (images) a temperature distribution of a measurement target two-dimensionally by disposing a plurality of thermistor elements in an array.

Patent Documents

[Patent Document 1] Japanese Unexamined Patent Application, First Publication No. 2000-348903
[Patent Document 2] PCT International Publication No. WO 2019/171488

SUMMARY

Incidentally, the thermistor element described in Patent Document 1 employs a current-in-plane (CIP) structure in which a current is caused to flow in an in-plane direction of a thermistor film. However, in the CIP structure, since a resistance value of the thermistor film is high, there is a problem in that a resistance value of the thermistor film between electrodes becomes excessive along with miniaturization, and it becomes difficult to take out a detection signal.

It is desirable to provide a thermistor element in which a resistance value of a thermistor film is able to be reduced and further miniaturization is able to be achieved, and an electromagnetic wave sensor in which further miniaturization is able to be achieved by including such a thermistor element.

Following means are provided.

(1) A thermistor element including a thermistor film, a first electrode provided in contact with one surface of the thermistor film, and a pair of second electrodes provided in contact with the other surface of the thermistor film, wherein the thermistor film comprises an oxide having a spinel crystal structure and having a [111] preferred orientation in a film thickness direction.

(2) An electromagnetic wave sensor including at least one thermistor element according to (1) described above.

(3) The electromagnetic wave sensor according to (2) described above, wherein the at least one thermistor element comprises a plurality of thermistor elements, and wherein the thermistor elements are arranged in an array.

According to the present disclosure, it is possible to provide a thermistor element in which a resistance value of a thermistor film is able to be reduced and further miniaturization is able to be achieved, and an electromagnetic wave sensor in which further miniaturization is able to be achieved by including such a thermistor element.

DETAILED DESCRIPTION

Figure 1:
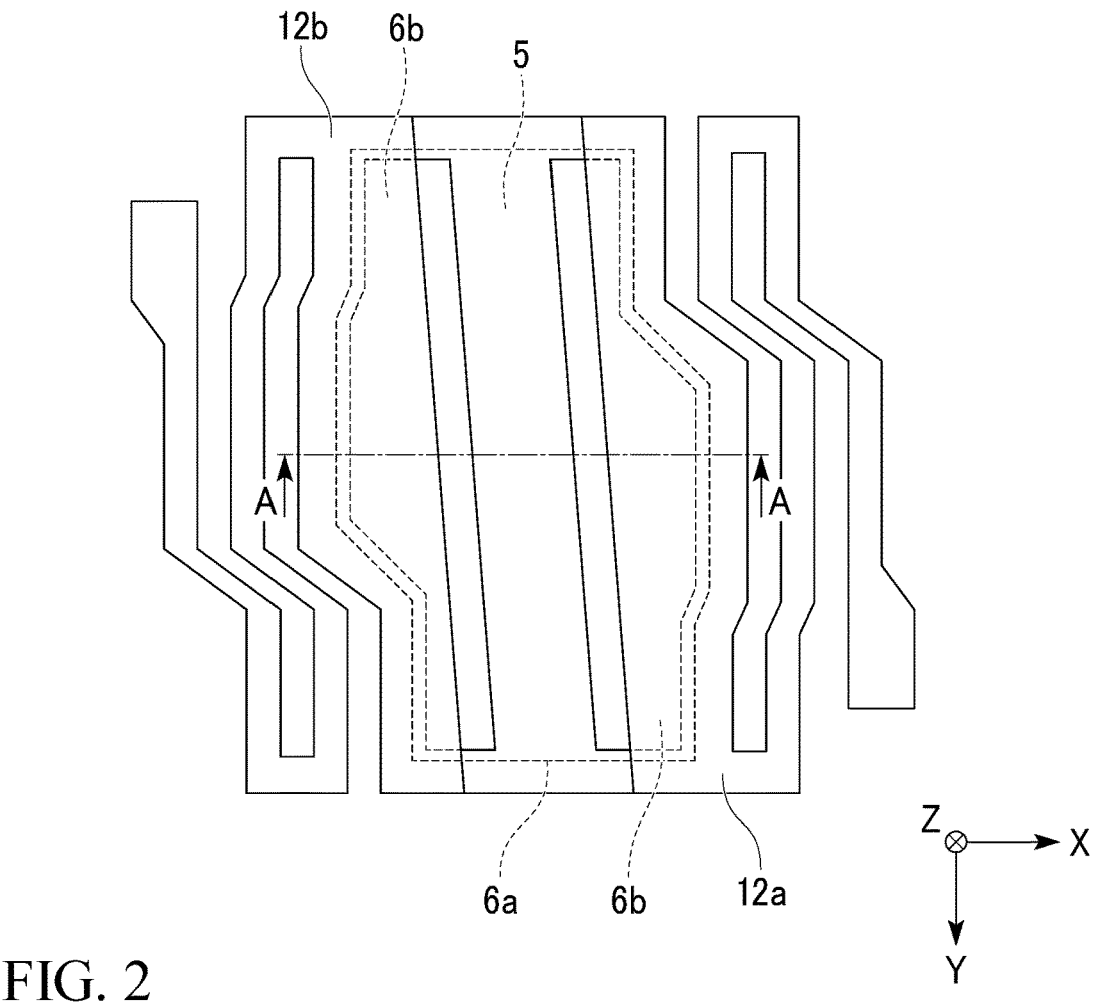
FIG. 1 is a plan view illustrating a configuration of a thermistor element according to one embodiment of the present disclosure.

Hereinafter, an embodiment of the present disclosure will be described in detail with reference to the drawings.

In the drawings used in the following description, in order to make the respective constituent elements easier to see, scales of dimensions may be different depending on the constituent elements, and dimensional proportions and the like between respective constituent elements may not be the same as the actual ones. Also, materials and the like illustrated in the following description are merely examples, and the present disclosure is not necessarily limited thereto and can be implemented with appropriate modifications within a range not changing the gist thereof.

[Thermistor Element]

First, as one embodiment of the present disclosure, for example, a thermistor element 4 illustrated in FIGS. 1 and 2 will be described.

FIG. 1 is a plan view illustrating a configuration of the thermistor element 4. FIG. 2 is a cross-sectional view of the thermistor element 4 along a line segment A-A illustrated in FIG. 1.

Figure 2:
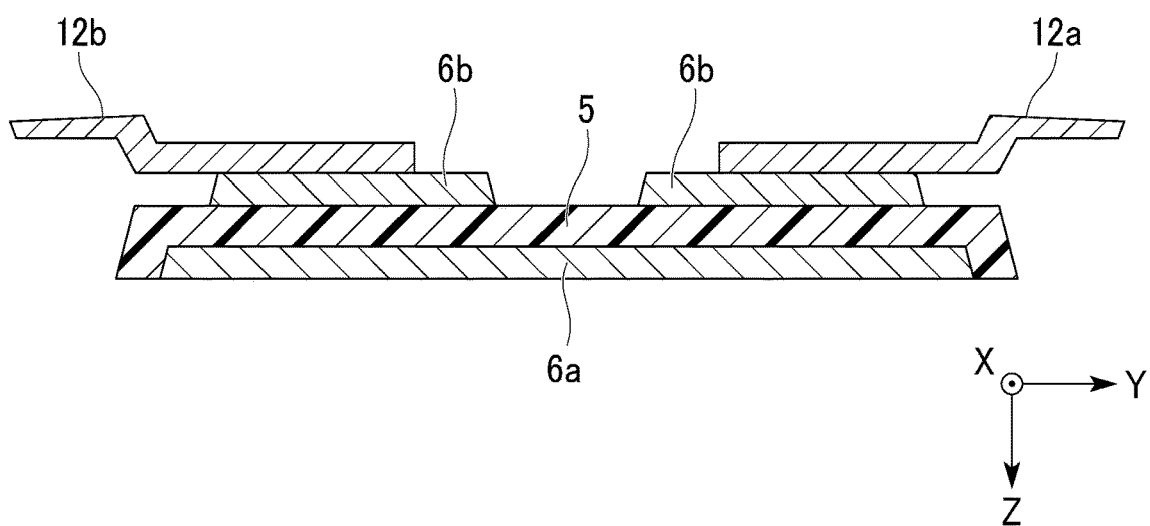
FIG. 2 is a cross-sectional view of the thermistor element along a line segment A-A illustrated in FIG. 1.

As illustrated in FIGS. 1 and 2, the thermistor element 4 of the present embodiment includes a thermistor film 5, a first electrode 6a provided in contact with one surface (lower surface in FIG. 2) of the thermistor film 5, and a pair of second electrodes 6b provided in contact with the other surface (upper surface in FIG. 2) of the thermistor film 5, and has a current-perpendicular-to-plane (CPP) structure in which a current flows in a direction perpendicular to a plane of the thermistor film 5. The first electrode 6a and the second electrodes 6b are disposed to sandwich the thermistor film 5, and the second electrodes 6b face the first electrode 6a in a film thickness direction of the thermistor film 5.

That is, in the thermistor element 4, it is possible to cause a current to flow in the direction perpendicular to the plane of the thermistor film 5 from one of the second electrodes 6b toward the first electrode 6a and cause a current to flow in the direction perpendicular to the plane of the thermistor film 5 from the first electrode 6a toward the other of the second electrodes 6b.

A resistance value of the thermistor film 5 depends on a thickness of the thermistor film 5 and a size of a facing area between the first electrode 6a and the second electrodes 6b. Therefore, when the above-described CPP structure is employed, the resistance of the thermistor film 5 can be lowered compared to that in a CIP structure.

Incidentally, the thermistor element 4 of the present embodiment is characterized in that the thermistor film 5 comprises an oxide having a spinel crystal structure (a spinel-type crystal structure) and having a [111] preferred orientation in a film thickness direction. The thermistor film 5 has the [111] preferred orientation in the film thickness direction at portions sandwiched between the first electrode 6a and the second electrodes 6b.

Here, the term "[111] preferred orientation in a film thickness direction" is meant to include a state in which a diffraction peak intensity from a (111) plane of a spinel crystal structure is greater than diffraction peak intensities from other crystal planes in a θ–2θ scan by out-of-plane measurement of an X-ray diffraction method, and a state in which only a diffraction peak from the (111) plane of the spinel crystal structure is observed in the θ–2θ scan by the out-of-plane measurement of the X-ray diffraction method.

Further, the thermistor element 4 of the present embodiment is not necessarily limited to one in which a proportion of one or more oxides having a spinel crystal structure and having a [111] preferred orientation in the film thickness direction contained in the thermistor film 5 is 100%. The proportion may be at least 70% or more.

As the thermistor film 5, oxides having a spinel crystal structure containing cobalt (Co), manganese (Mn), aluminum (Al), and at least one transition element may be used. Also, the transition elements may be one or more of nickel (Ni), copper (Cu), and iron (Fe).

Also, as the thermistor film 5, oxides having a spinel crystal structure containing nickel (Ni), manganese (Mn), aluminum (Al), and at least one transition element may be used. Also, the transition elements may be one or more of cobalt (Co), copper (Cu), and iron (Fe).

Of the metal elements constituting the thermistor film 5, main component metal elements may be "Co and Mn" or "Ni and Mn." The main component metal element can be positioned at either A sites or B sites of a spinel crystal structure represented by a general expression $AB_2O_4$.

On the other hand, accessory component metal elements may be "Al and transition elements." The accessory component transition elements can be positioned at either the A sites or the B sites, but Al is mostly positioned at the B sites.

As the first electrode 6a and the second electrodes 6b, a conductive film of such as, for example, platinum (Pt), gold (Au), palladium (Pd), ruthenium (Ru), silver (Ag), rhodium (Rh), and iridium (Ir), osmium (Os), or the like can be used.

Also, when platinum (Pt) having a [111] preferred orientation in a film thickness direction is used for the first electrode 6a, the thermistor film 5 formed on a surface of the first electrode 6a can be made to have a [111] preferred orientation in the film thickness direction.

In the thermistor element 4 of the present embodiment, the thermistor film 5 described above is formed of an oxide having the spinel crystal structure, the thermistor film 5 has a [111] preferred orientation in the film thickness direction, and thereby a resistance value of the thermistor film 5 between the first electrode 6a and the second electrodes 6b can be reduced.

[Electromagnetic Wave Sensor]

Next, as one embodiment of the present disclosure, for example, an electromagnetic wave sensor 1 illustrated in FIGS. 3 to 5 will be described.

Figure 3:
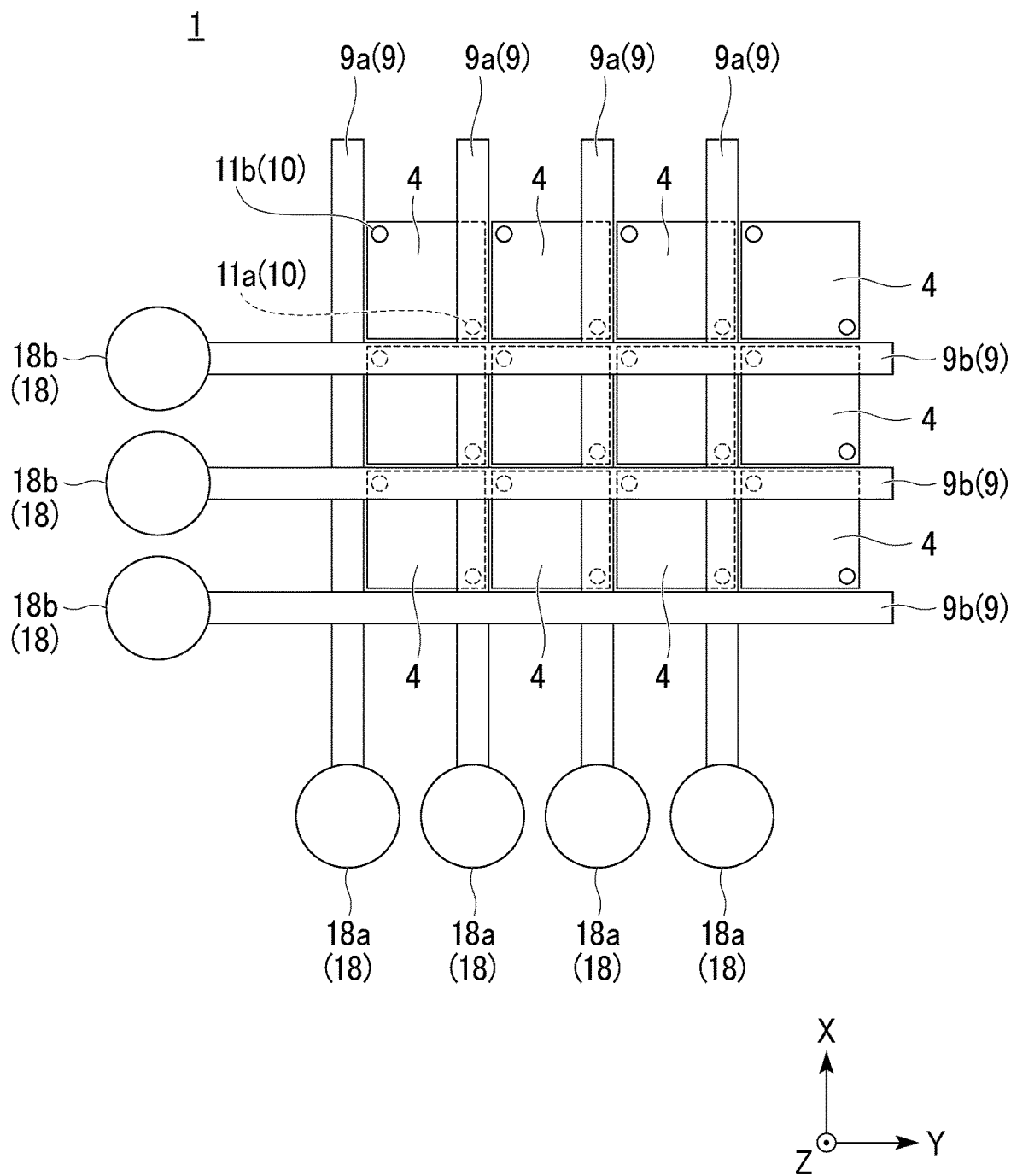
FIG. 3 is a plan view illustrating a configuration of an electromagnetic wave sensor including the thermistor element illustrated in FIG. 1.

FIG. 3 is a plan view illustrating a configuration of the electromagnetic wave sensor 1. FIG. 4 is an exploded perspective view illustrating the configuration of the electromagnetic wave sensor 1. FIG. 5 is a cross-sectional view illustrating the configuration of the electromagnetic wave sensor 1.

Also, in the drawings illustrated below, an XYZ orthogonal coordinate system is set, in which an X-axis direction is set as a first direction X in a specific plane of the electromagnetic wave sensor 1, a Y-axis direction is set as a second direction Y perpendicular to the first direction X in the specific plane of the electromagnetic wave sensor 1, and a Z-axis direction is set as a third direction Z perpendicular to the specific plane of the electromagnetic wave sensor 1.

The electromagnetic wave sensor 1 of the present embodiment is an application of the present disclosure to an infrared imaging element (infrared image sensor) that detects (images) a temperature distribution of a measurement target two-dimensionally by detecting infrared rays (electromagnetic waves) emitted from the measurement target.

Infrared rays are electromagnetic waves having a wavelength of 0.75 μm or more and 1000 μm or less. An infrared image sensor is used as an infrared camera for indoor or outdoor night vision and is used as a non-contact temperature sensor for measuring a temperature of people or objects.

Figure 4:
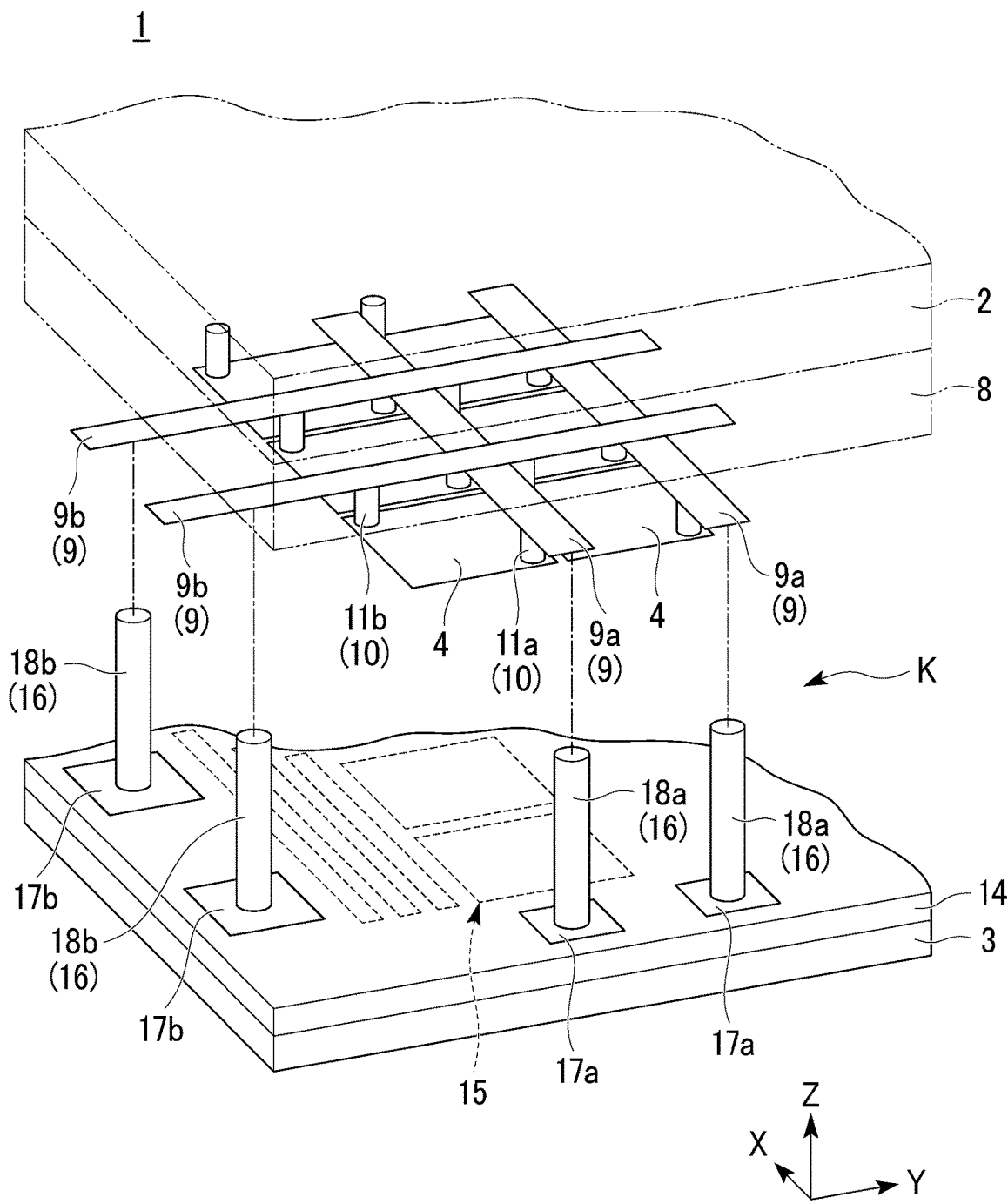
FIG. 4 is an exploded perspective view illustrating the configuration of the electromagnetic wave sensor illustrated in FIG. 3.
Figure 5:
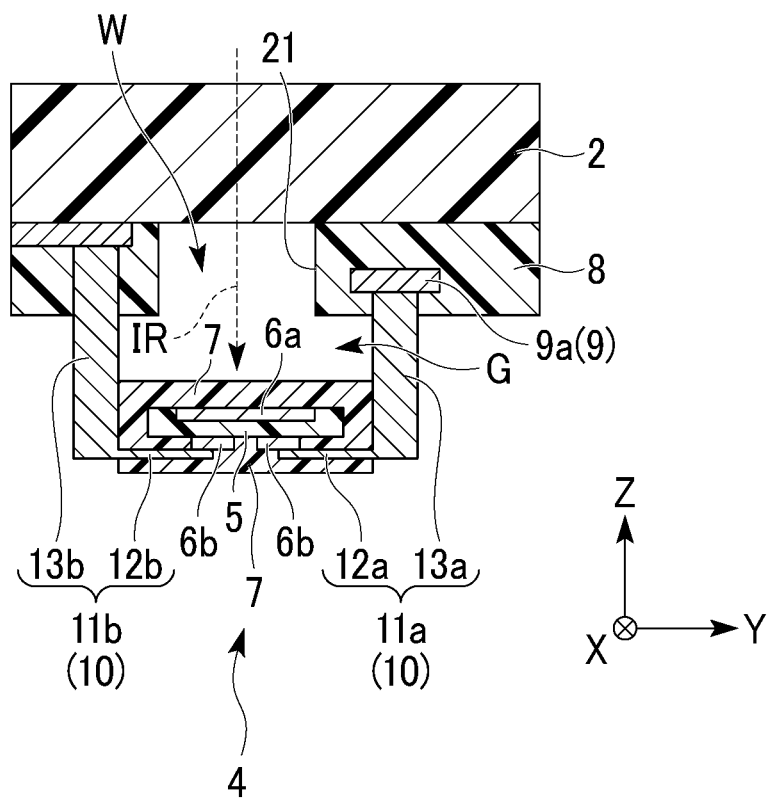
FIG. 5 is a cross-sectional view illustrating the configuration of the electromagnetic wave sensor illustrated in FIG. 3.

Specifically, as illustrated in FIGS. 3 to 5, the electromagnetic wave sensor 1 includes a first substrate 2 and a second substrate 3 disposed to face each other, and a plurality of thermistor elements 4 disposed between the first substrate 2 and the second substrate 3.

The first substrate 2 and the second substrate 3 are formed of a silicon substrate having transmittance with respect to electromagnetic waves IR having a specific wavelength (long-wavelength infrared rays having a wavelength of 8 to 14 μm in the present embodiment) (hereinafter referred to as "infrared rays"). Also, as the substrate having transmittance with respect to the infrared rays IR, a germanium substrate or the like can be used.

The first substrate 2 and the second substrate 3 form an internal space K therebetween by circumferences of surfaces facing each other being sealed with a sealing material (not illustrated). Also, the pressure of the internal space K is reduced to a high vacuum. Thereby, in the electromagnetic wave sensor 1, an influence of heat due to convection in the internal space K is suppressed, and an influence of heat other than the infrared rays IR emitted from the measurement target on the thermistor elements 4 is suppressed.

Further, the electromagnetic wave sensor 1 of the present embodiment is not necessarily limited to a configuration in which the pressure of the above-described sealed internal space K is reduced and may have a configuration in which the internal space K is sealed or open at atmospheric pressure.

The thermistor elements 4 each include the thermistor film 5 that detects infrared rays IR, the first electrode 6a provided in contact with one surface of the thermistor film 5, the pair of second electrodes 6b provided in contact with the other surface of the thermistor film 5, and a dielectric film 7 that covers the thermistor film 5, and have a current-perpendicular-to-plane (CPP) structure in which a current flows in a direction perpendicular to a plane of the thermistor film 5.

For the dielectric film 7, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The dielectric film 7 may be configured to cover at least a part of at least the thermistor film 5. In the present embodiment, the dielectric film 7 is provided to cover both surfaces of the thermistor film 5.

The plurality of thermistor elements 4 have the same size as each other and are each formed in a rectangular shape (square shape in the present embodiment) in a plan view. Also, the plurality of thermistor elements 4 are arranged in an array in a plane parallel to the first substrate 2 and the second substrate 3 (hereinafter, referred to as "in a specific plane"). That is, the plurality of thermistor elements 4 are disposed to be aligned in a matrix in the first direction X and the second direction Y that intersect each other (orthogonally in the present embodiment) in a specific plane.

Also, when the first direction X is referred to as a row direction and the second direction Y is referred to as a column direction, the thermistor elements 4 are disposed to be aligned at regular intervals in the first direction X and disposed to be aligned at regular intervals in the second direction Y.

Further, examples of a size of matrix of the above-described thermistor elements 4 include 640 rows×480 columns and 1024 rows×768 columns, but the size of the matrix is not necessarily limited thereto and can be changed as appropriate.

On the first substrate 2 side, a first insulator layer 8, a wiring part 9 electrically connected to a circuit unit 15 to be described later, and a first connecting part 10 for electrically connecting between each thermistor element 4 and the wiring part 9 are provided.

The first insulator layer 8 is formed of an insulating film laminated on one surface (a surface facing the second substrate 3) side of the first substrate 2. For the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The wiring part 9 includes a plurality of first lead wirings 9a and a plurality of second lead wirings 9b. The first lead wirings 9a and the second lead wirings 9b are formed of a conductive film such as, for example, copper or gold.

The plurality of first lead wirings 9a and the plurality of second lead wirings 9b are positioned in different layers in the third direction Z of the first insulator layer 8 and are disposed to intersect three-dimensionally. Of these, the plurality of first lead wirings 9a extend in the first direction X and are provided to be aligned in the second direction Y at regular intervals. On the other hand, the plurality of second lead wirings 9b extend in the second direction Y and are provided to be aligned in the first direction X at regular intervals.

The thermistor elements 4 are each provided for each region defined by the plurality of first lead wirings 9a and the plurality of second lead wirings 9b in a plan view. In a region facing each thermistor film 5 in a thickness direction of the first substrate 2 (a region overlapping in a plan view), there is a window portion W that allows infrared rays IR to be transmitted between the first substrate 2 and the thermistor film 5.

The first connecting part 10 includes a pair of first connecting members 11a and 11b provided corresponding to each of the plurality of thermistor elements 4. Also, the pair of first connecting members 11a and 11b have a pair of arm parts 12a and 12b and a pair of leg parts 13a and 13b.

The arm parts 12a and 12b are each formed of a bent line-shaped conductor pattern formed along a circumference of the thermistor element 4 using a thin film of such as, for example, titanium or titanium nitride. The leg parts 13a and 13b are each formed of a conductor pillar having a circular cross section formed to extend in the third direction Z using plating of such as, for example, copper, gold, FeCoNi alloy, or NiFe alloy (permalloy).

One first connecting member 11a includes one arm part 12a electrically connected to one second electrode 6b and one leg part 13a for electrically connecting between one arm part 12a and the first lead wiring 9a to electrically connect between one second electrode 6b and the first lead wiring 9a.

The other first connecting member 11b includes the other arm part 12b electrically connected to the other second electrode 6b and the other leg part 13b for electrically connecting between the other arm part 12b and the second lead wiring 9b to electrically connect between the other second electrode 6b and the second lead wiring 9b.

Thereby, the thermistor element 4 is supported in a state of being suspended in the third direction Z by the pair of first connecting members 11a and 11b positioned in a diagonal direction in the plane thereof. Also, a space G is provided between the thermistor element 4 and the first insulator layer 8.

Although illustration is omitted, a plurality of selection transistors (not illustrated) for selecting one thermistor element 4 from the plurality of thermistor elements 4 are provided on one surface (a surface facing the second substrate 3) side of the first substrate 2. The plurality of selection transistors are provided at positions on the first substrate 2 respectively corresponding to the plurality of thermistor elements 4. Also, the selection transistors are each provided at a position other than the above-described window portion W to prevent diffuse reflection of the infrared rays IR and deterioration in efficiency of incidence.

On the second substrate 3 side, a second insulator layer 14, the circuit unit 15 that detects a change in voltage output from the thermistor element 4 to convert it into a brightness temperature, and a second connecting part 16 for electrically connecting between each thermistor element 4 and the circuit unit 15 are provided.

The second insulator layer 14 is formed of an insulating film laminated on one surface (a surface facing the first substrate 2) side of the second substrate 3. As the insulating film, the same insulating film as that exemplified in the first insulator layer 8 described above can be used.

The circuit unit 15 includes a read out integrated circuit (ROIC), a regulator, an analog-to-digital converter (A/D converter), a multiplexer, and the like and is provided in the second insulator layer 14.

Also, a plurality of connecting terminals 17a and 17b respectively corresponding to the plurality of first lead wirings 9a and the plurality of second lead wirings 9b are provided on a surface of the second insulator layer 14. The connecting terminals 17a and 17b are formed of a conductive film such as, for example, copper or gold.

The connecting terminals 17a on one side are positioned in a region surrounding a circumference of the circuit unit 15 on one side in the first direction X and are provided to be aligned at regular intervals in the second direction Y. The connecting terminals 17b on the other side are positioned in a region surrounding the circumference of the circuit unit 15 on one side in the second direction Y and are provided to be aligned at regular intervals in the first direction X.

The second connecting parts 16 include a plurality of second connecting members 18a and 18b provided corresponding to the plurality of first lead wirings 9a and the plurality of second lead wirings 9b. The plurality of second connecting members 18a and 18b are formed of conductor pillars having a circular cross section formed to extend in the third direction Z using plating of such as, for example, copper or gold.

The second connecting members 18a on one side electrically connect one end sides of the first lead wirings 9a and the connecting terminals 17a on one side. The second connecting members 18b on the other side electrically connect one end sides of the second lead wirings 9b and the connecting terminals 17b on the other side. Thereby, the plurality of first lead wirings 9a and the circuit unit 15 are electrically connected via the second connecting members 18a on one side and the connecting terminals 17a on one side. Also, the plurality of second lead wirings 9b and the circuit unit 15 are electrically connected via the second connecting members 18b on the other side and the connecting terminals 17b on the other side.

In the electromagnetic wave sensor 1 of the present embodiment having the above configuration, the infrared rays IR emitted from the measurement target are incident on the thermistor element 4 from the first substrate 2 side through the window portion W.

In the thermistor element 4, the infrared rays IR incident on the dielectric film 7 formed in the vicinity of the thermistor film 5 are absorbed by the dielectric film 7, the infrared rays IR incident on the thermistor film 5 are absorbed by the thermistor film 5, and thereby a temperature of the thermistor film 5 changes. Also, in the thermistor element 4, an electrical resistance of the thermistor film 5 changes in response to temperature change of the thermistor film 5, and thereby an output voltage between the pair of second electrodes 6b changes. In the electromagnetic wave sensor 1 of the present embodiment, the thermistor element 4 functions as a bolometer element.

In the electromagnetic wave sensor 1 of the present embodiment, the infrared rays IR emitted from the measurement target are detected in a planar manner by the plurality of thermistor elements 4, then an electrical signal (voltage signal) output from each of the thermistor elements 4 is converted into a brightness temperature, and thereby a temperature distribution (temperature image) of the measurement target can be detected (imaged) two-dimensionally.

Further, when a constant voltage is applied to the thermistor film 5, it is also possible for the thermistor element 4 to detect a change in current flowing through the thermistor film 5 in response to a temperature change of the thermistor film 5 and convert it into a brightness temperature.

In the electromagnetic wave sensor 1 of the present embodiment, even when the plurality of thermistor elements 4 are arranged in an array, further miniaturization can be achieved.

Further, the present disclosure is not necessarily limited to those in the above-described embodiment, and various modifications can be made in a range not departing from the meaning of the present disclosure.

For example, the electromagnetic wave sensor to which the present disclosure is applied is not necessarily limited to the configuration of the infrared image sensor in which the above-described plurality of thermistor elements 4 are arranged in an array, and the present disclosure can also be applied to an electromagnetic wave sensor using a single thermistor element 4, an electromagnetic wave sensor in which a plurality of thermistor elements 4 are disposed to be linearly aligned, or the like. It is also possible to use the thermistor element 4 as a temperature sensor for measuring a temperature.

Also, the electromagnetic wave sensor to which the present disclosure is applied is not necessarily limited to one for detecting the above-described infrared rays as electromagnetic waves and may also be one for detecting a terahertz wave having a wavelength of, for example, 30 μm or more and 3 mm or less.

EXAMPLES

Hereinafter, effects of the present disclosure will become apparent by examples. Further, the present disclosure is not limited to the following examples and can be implemented with appropriate modifications within a range not changing the gist thereof.

In the present example, thermistor films of examples 1 and 2 and comparative examples 1 and 2 shown in Table 1 below were prepared under conditions shown in Tables 2 and 3 below, and resistivity [Ω·cm] thereof was measured.

TABLE 1

|  | Composition | Crystal structure | Thermistor film orientation | Base | Heat treatment temperature | Current direction | Resistivity (Ω · cm) |
|---|---|---|---|---|---|---|---|
| Example1 | Co, Mn, Ni = 44:43:13 | Spinel type | (111) | Pt | 250° C. | Perpendicular-to-plane | 307 |
| Comparative example1 | Co, Mn, Ni = 44:43:13 | Spinel type | Random | $SiO_2$ | 250° C. | In-plane | 531 |
| Example2 | Co, Mn, Cu = 44:42:14 | Spinel type | (111) | Pt | 250° C. | Perpendicular-to-plane | 67 |

TABLE 1-continued

| | Composition | Crystal structure | Thermistor film orientation | Base | Heat treatment temperature | Current direction | Resistivity (Ω·cm) |
|---|---|---|---|---|---|---|---|
| Comparative example2 | Co, Mn, Cu = 44:42:14 | Spinel type | Random | SiO₂ | 250° C. | In-plane | 185 |

TABLE 2

| Pt base film deposition condition | | | | SiO₂ base film deposition condition | | | |
|---|---|---|---|---|---|---|---|
| Power input | Deposition gas | Deposition pressure | Substrate temperature | Power input | Deposition gas | Deposition pressure | Substrate temperature |
| DC 300 W | Ar | 0.05 Pa | 25° C. | RF 900 W | Ar | 0.9 Pa | 25° C. |

TABLE 3

| Thermistor film deposition condition | | | | Thermistor film heat treatment condition | |
|---|---|---|---|---|---|
| Power input | Deposition gas | Deposition pressure | Substrate temperature | Temperature | Time |
| DC 300 W | Ar | 0.02 Pa | 25° C. | 250° C. | 1 h |

Example 1

In example 1, first, as shown in Table 2, a base film (corresponding to the first electrode 6a of the thermistor element 4 illustrated in FIG. 2) formed of Pt was deposited on a Si substrate, on which a thermal oxide film was formed, by a DC sputtering method under conditions of a power input of 300 W, a deposition gas Ar, a deposition pressure of 0.05 Pa, and a substrate temperature of 25° C. Next, as shown in Table 3, a Co—Mn—Ni oxide film having a compositional proportion of Co:Mn:Ni=44:43:13 was deposited on the base film by a DC sputtering method under conditions of a power input of 300 W, a deposition gas Ar, a deposition pressure of 0.02 Pa, and a substrate temperature of 25° C., then a heat treatment was performed for 1 hour at a temperature of 250° C., and thereby a thermistor film formed of an oxide having a spinel crystal structure containing Co, Mn, and Ni was formed.

Figure 6:
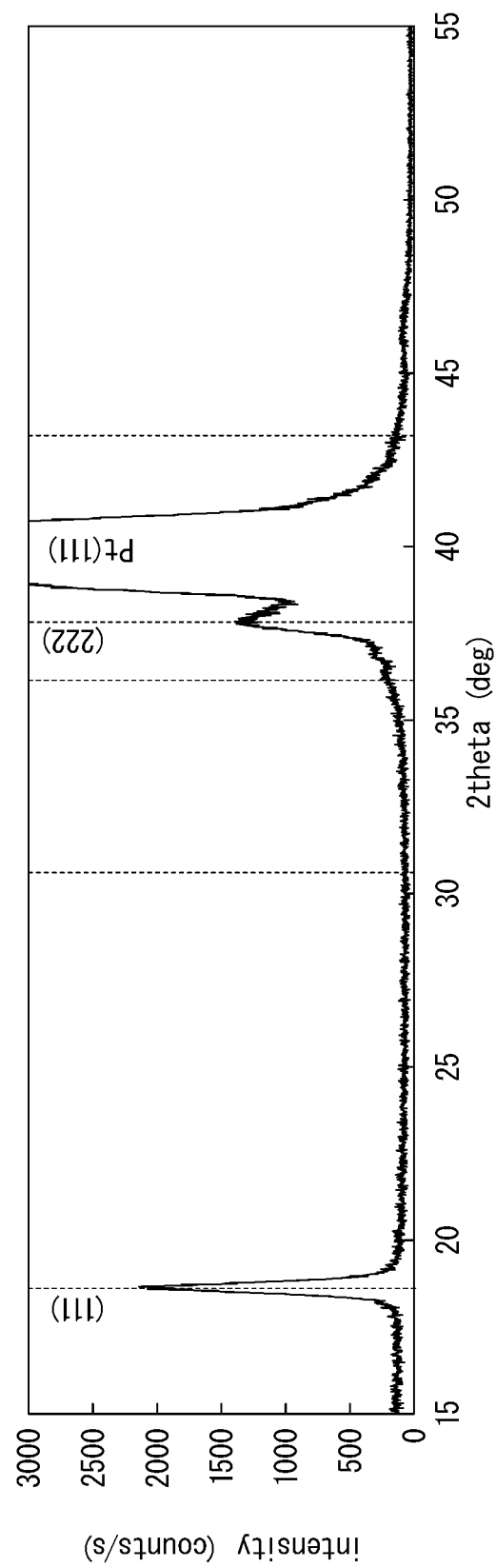
FIG. 6 is a graph showing measurement results of a thermistor film in example 1 by an X-ray diffraction method.

The thermistor film of example 1 had a spinel crystal structure, and as a result of measurement by θ–2θ scan (hereinafter, referred to as "θ–2θ scan of an X-ray diffraction method") by out-of-plane measurement of an X-ray diffraction method, it was found that the thermistor film had a [111] preferred orientation in a film thickness direction as shown in the graph of FIG. 6. Also, it was found that the base film formed of Pt also had a [111] preferred orientation in the film thickness direction.

Also, when a thermistor element having a CPP structure was manufactured using the thermistor film of example 1 and a current was caused to flow in a direction perpendicular to a plane of the thermistor film to measure resistivity, the resistivity of the thermistor film was 307 Ω·cm.

Comparative Example 1

In comparative example 1, first, as shown in Table 2, a base film formed of SiO₂ was deposited on a Si substrate by an RF sputtering method under conditions of a power input of 900 W, a deposition gas Ar, a deposition pressure of 0.9 Pa, and a substrate temperature of 25° C. Next, as shown in Table 3, a Co—Mn—Ni oxide film having a compositional proportion of Co:Mn:Ni=44:43:13 was deposited on the base film by a DC sputtering method under conditions of a power input of 300 W, a deposition gas Ar, a deposition pressure of 0.02 Pa, and a substrate temperature of 25° C., then a heat treatment was performed for 1 hour at a temperature of 250° C., and thereby a thermistor film formed of an oxide having a spinel crystal structure containing Co, Mn, and Ni was formed.

Figure 7:
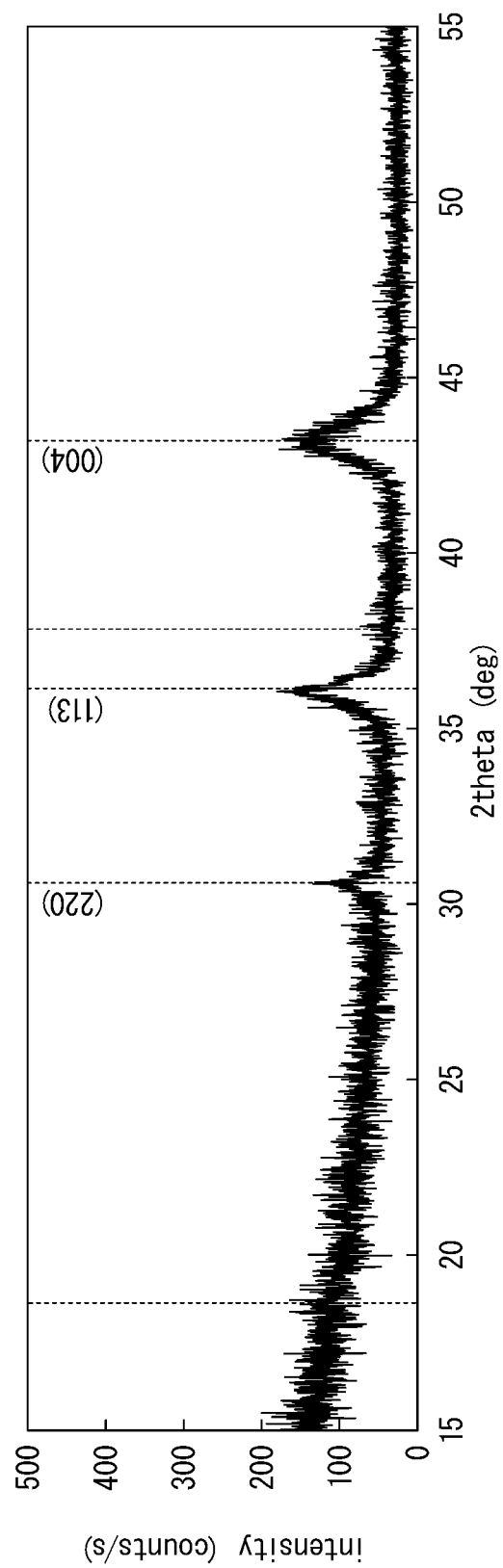
FIG. 7 is a graph showing measurement results of a thermistor film in comparative example 1 by an X-ray diffraction method.

The thermistor film of comparative example 1 had a spinel crystal structure, and as a result of measurement by θ–2θ scan of an X-ray diffraction method, it was found that the thermistor film was randomly oriented as shown in the graph of FIG. 7.

Also, when a thermistor element having a CIP structure (corresponding to a base film formed of SiO₂ instead of the first electrode 6a of the thermistor element 4 illustrated in FIG. 2) was manufactured using the thermistor film of comparative example 1 and a current was caused to flow in an in-plane direction of the thermistor film to measure resistivity, the resistivity of the thermistor film was 531 Ω·cm.

Example 2

In example 2, first, as shown in Table 2, a base film (corresponding to the first electrode 6a of the thermistor element 4 illustrated in FIG. 2) formed of Pt was deposited on a Si substrate, on which a thermal oxide film was formed, by a DC sputtering method under conditions of a power input of 300 W, a deposition gas Ar, a deposition pressure of 0.05 Pa, and a substrate temperature of 25° C. Next, as shown in Table 3, a Co—Mn—Cu oxide film having a compositional proportion of Co:Mn:Cu=44:42:14 was deposited on the base film by a DC sputtering method under conditions of a power input of 300 W, a deposition gas Ar, a deposition pressure of 0.02 Pa, and a substrate temperature of 25° C., then a heat treatment was performed for 1 hour at a temperature of 250° C., and thereby a thermistor film formed of an oxide having a spinel crystal structure containing Co, Mn, and Cu was formed.

Figure 8:
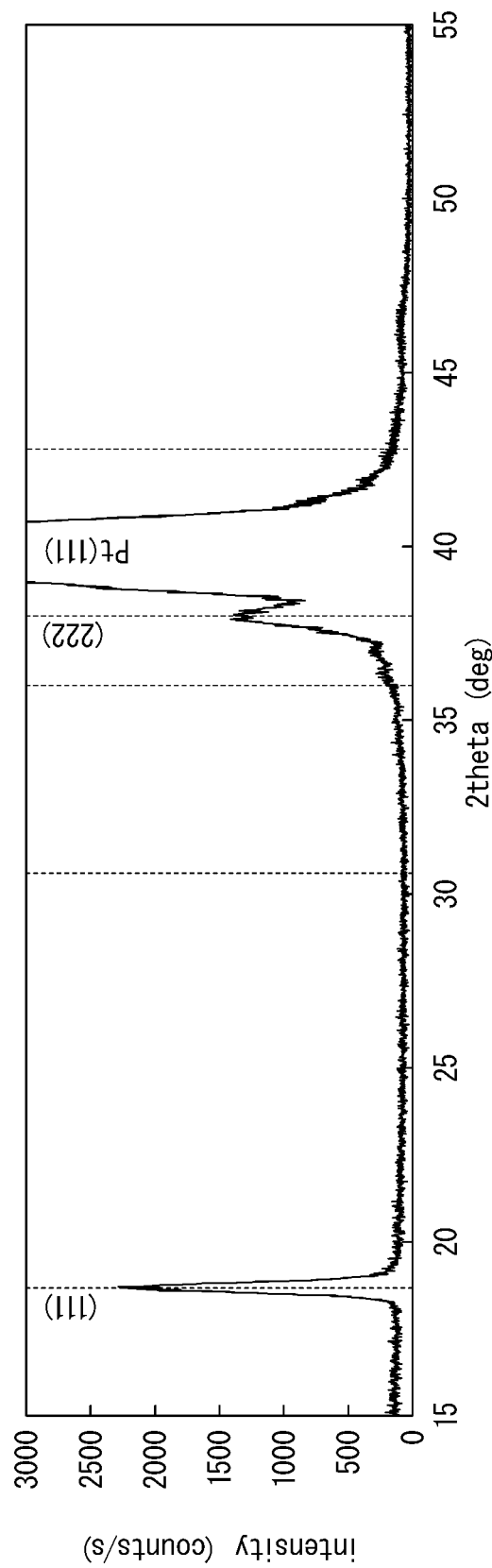
FIG. 8 is a graph showing measurement results of a thermistor film in example 2 by an X-ray diffraction method.

The thermistor film of example 2 had a spinel crystal structure, and as a result of measurement by θ–2θ scan of an X-ray diffraction method, it was found that the thermistor film had a [111] preferred orientation in a film thickness direction as shown in the graph of FIG. 8. Also, it was found that the base film formed of Pt also had a [111] preferred orientation in the film thickness direction.

Also, when a thermistor element having a CPP structure was manufactured using the thermistor film of example 2 and a current was caused to flow in a direction perpendicular to a plane of the thermistor film to measure resistivity, the resistivity of the thermistor film was 67 Ω·cm.

Comparative Example 2

In comparative example 2, first, as shown in Table 2, a base film formed of $SiO_2$ was deposited on a Si substrate by an RF sputtering method under conditions of a power input of 900 W, a deposition gas Ar, a deposition pressure of 0.9 Pa, and a substrate temperature of 25° C. Next, as shown in Table 3, a Co—Mn—Cu oxide film having a compositional proportion of Co:Mn:Cu=44:42:14 was deposited on the base film by a DC sputtering method under conditions of a power input of 300 W, a deposition gas Ar, a deposition pressure of 0.02 Pa, and a substrate temperature of 25° C., then a heat treatment was performed for 1 hour at a temperature of 250° C., and thereby a thermistor film formed of an oxide having a spinel crystal structure containing Co, Mn, and Cu was formed.

Figure 9:
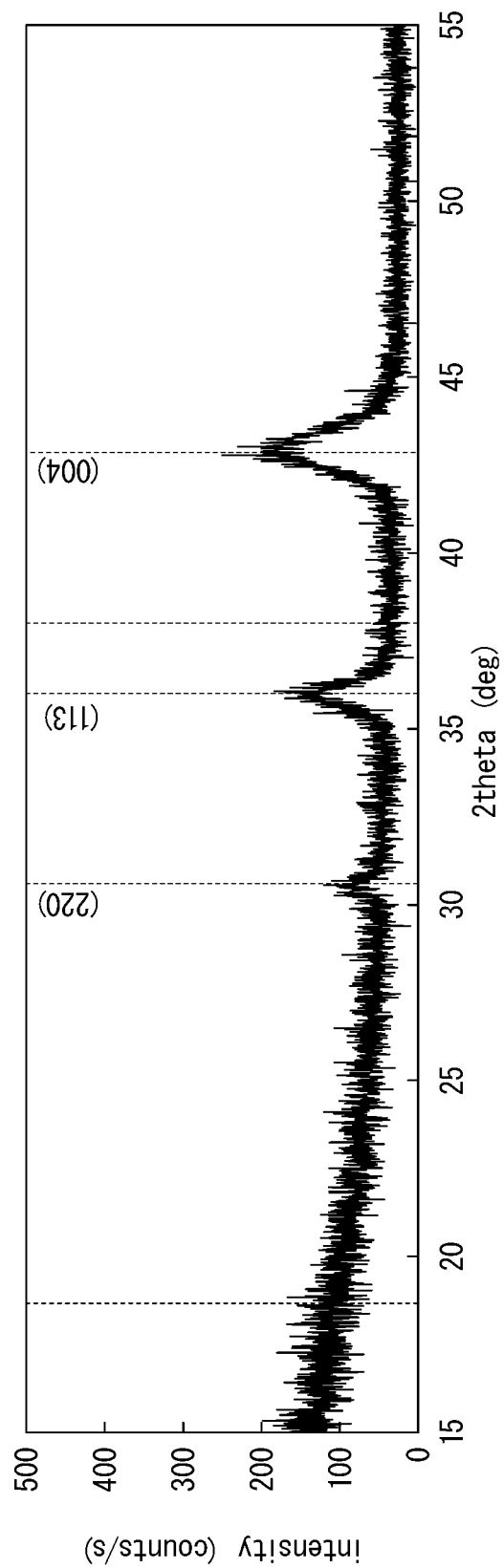
FIG. 9 is a graph showing measurement results of a thermistor film in comparative example 2 by an X-ray diffraction method.

The thermistor film of comparative example 2 had a spinel crystal structure, and as a result of measurement by θ-2θ scan of an X-ray diffraction method, it was found that the thermistor film was randomly oriented as shown in the graph of FIG. 9.

Also, when a thermistor element having a CIP structure (corresponding to a base film formed of $SiO_2$ instead of the first electrode 6a of the thermistor element 4 illustrated in FIG. 2) was manufactured using the thermistor film of comparative example 2 and a current was caused to flow in an in-plane direction of the thermistor film to measure resistivity, the resistivity of the thermistor film was 185 Ω·cm.

As described above, in example 1, resistivity of the thermistor film can be reduced than that in comparative example 1. That is, resistivity in a direction of the [111] preferred orientation is smaller than resistivity in a case of the random orientation.

Also, in example 2, resistivity of the thermistor film can be reduced than that in comparative example 2. That is, resistivity in a direction of the [111] preferred orientation is smaller than resistivity in a case of the random orientation.

As described above, when the thermistor film is formed of an oxide having a spinel crystal structure and the thermistor film has a [111] preferred orientation in the film thickness direction, a resistance value of the thermistor film between the first electrode and the second electrode that sandwich the thermistor film in the film thickness direction can be reduced.

While embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the invention is not to be considered as being limited by the foregoing description and is only limited by the scope of the appended claims.

What is claimed is:

1. A thermistor element comprising:
    a thermistor film;
    a first electrode provided in contact with one surface of the thermistor film; and
    a pair of second electrodes provided in contact with the other surface of the thermistor film, wherein
    the thermistor film comprises an oxide having a spinel crystal structure and having a [111] preferred orientation in a film thickness direction, and
    the [111] preferred orientation in a film thickness direction is:
        a state in which a diffraction peak intensity from a (111) plane of the spinel crystal structure is greater than diffraction peak intensities from other crystal planes in a θ-2θ scan by out-of-plane measurement of an X-ray diffraction method; or
        a state in which only a diffraction peak from the (111) plane of the spinel crystal structure is observed in the θ-2θ scan by the out-of-plane measurement of the X-ray diffraction method.

2. An electromagnetic wave sensor comprising at least one thermistor element according to claim 1.

3. The electromagnetic wave sensor according to claim 2, wherein the at least one thermistor element comprises a plurality of thermistor elements, and
wherein the thermistor elements are arranged in an array.

* * * * *